US008419333B2

(12) United States Patent
Wray

(10) Patent No.: US 8,419,333 B2
(45) Date of Patent: Apr. 16, 2013

(54) FASTENING DEVICES, SYSTEMS AND METHOD OF INSTALLATION

(76) Inventor: Robert P. Wray, King of Prussia, PA (US)

( * ) Notice: Subject to any disclaimer, the term of this patent is extended or adjusted under 35 U.S.C. 154(b) by 638 days.

(21) Appl. No.: 12/291,295

(22) Filed: Nov. 7, 2008

(65) Prior Publication Data

US 2009/0116931 A1 May 7, 2009

Related U.S. Application Data

(60) Provisional application No. 61/002,243, filed on Nov. 7, 2007.

(51) Int. Cl.
  *F16B 35/04* (2006.01)
  *E04B 1/38* (2006.01)
(52) U.S. Cl.
  USPC ........................................ 411/424; 52/745.15
(58) Field of Classification Search ............... 411/387.2, 411/411, 412, 417, 423, 424; 52/745.15
  See application file for complete search history.

(56) References Cited

U.S. PATENT DOCUMENTS

| | | | | | |
|---|---|---|---|---|---|
| 2,024,071 | A | * | 12/1935 | Taylor et al. ................. | 411/424 |
| 4,018,132 | A | * | 4/1977 | Abe .............................. | 411/413 |
| 4,653,244 | A | * | 3/1987 | Farrell ........................ | 52/745.21 |
| 4,655,656 | A | | 4/1987 | Jönsson | |
| 4,797,022 | A | * | 1/1989 | Crigger ....................... | 403/408.1 |
| 5,295,774 | A | * | 3/1994 | Roberts ........................ | 411/387.2 |
| 5,516,248 | A | * | 5/1996 | DeHaitre ..................... | 411/387.2 |
| 5,647,606 | A | * | 7/1997 | Jordan ....................... | 280/86.751 |
| 6,109,850 | A | * | 8/2000 | Commins .................... | 411/387.2 |
| D551,543 | S | * | 9/2007 | Williams et al. ............... | D8/387 |
| D552,976 | S | * | 10/2007 | Gaudron ........................ | D8/387 |
| D567,074 | S | * | 4/2008 | Gallien ......................... | D8/387 |
| 7,717,015 | B2 | * | 5/2010 | Nilsen et al. .................. | 81/176.2 |
| 2001/0009638 | A1 | * | 7/2001 | Crawford et al. ........... | 411/387.2 |
| 2004/0228705 | A1 | * | 11/2004 | Baer et al. ...................... | 411/424 |
| 2007/0122250 | A1 | * | 5/2007 | Mullner ........................... | 411/408 |
| 2009/0148254 | A1 | * | 6/2009 | Carrillo et al. ................. | 411/404 |

FOREIGN PATENT DOCUMENTS

| GB | 2124318 A | * | 2/1984 |
|---|---|---|---|
| GB | 2132528 A | * | 7/1984 |

* cited by examiner

*Primary Examiner* — Christine T Cajilig
(74) *Attorney, Agent, or Firm* — Frank J. Bonini, Jr.; John F. A. Earley, III; Harding, Earley, Follmer & Frailey, P.C.

(57) ABSTRACT

Devices methods, and systems for facilitating the installation of an item to a structure, and including for installation of doors and windows, and in particular for plumbing and/or leveling door/window jambs is provided. The devices may be used for facilitating the alignment of door/window jambs even before shims are installed. The devices may be adjusted to fine tune the installation. When the desired level of adjustment is reached, the jamb may then be permanently installed.

15 Claims, 7 Drawing Sheets

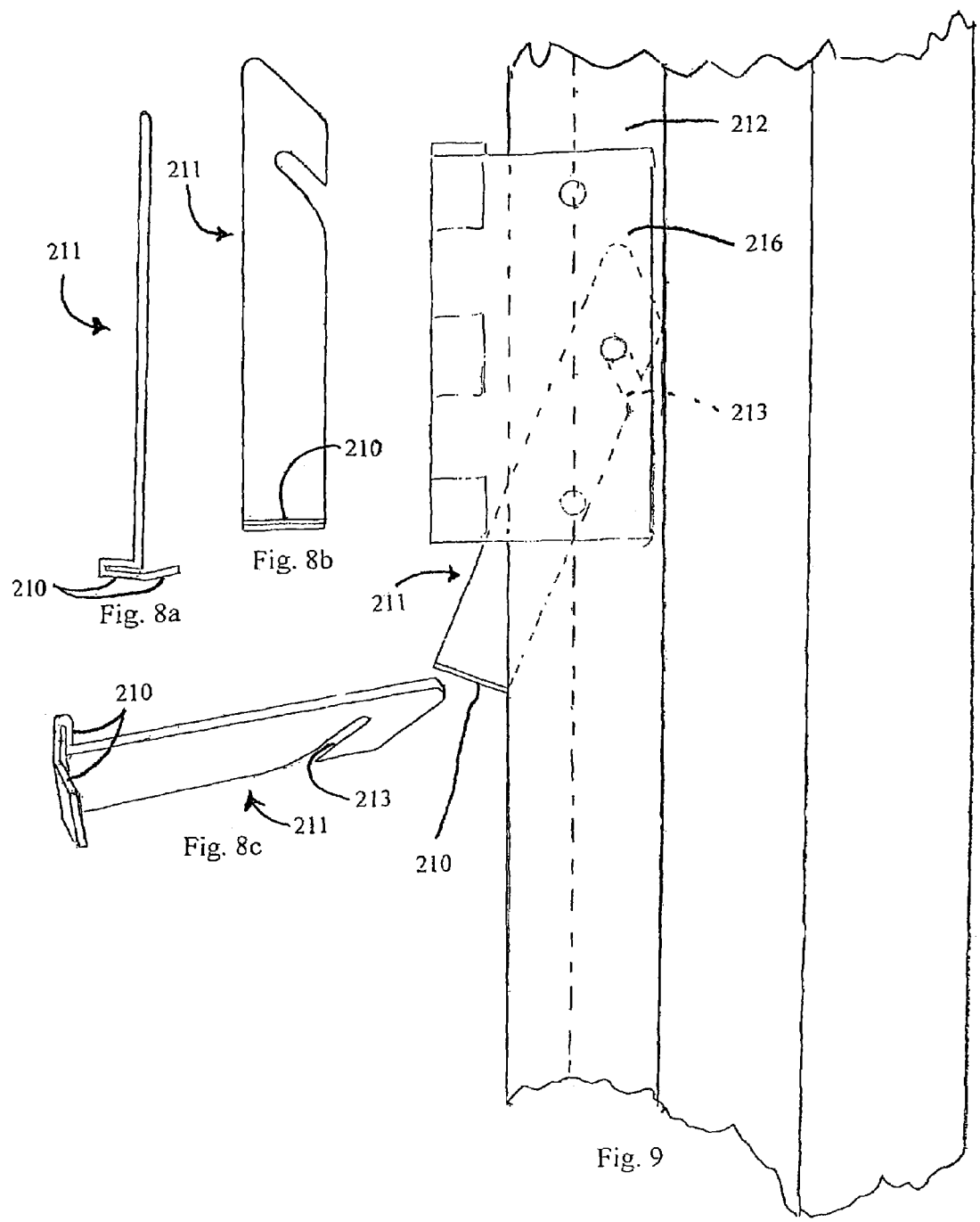

FASTENING DEVICES, SYSTEMS AND METHOD OF INSTALLATION

CROSS-REFERENCE TO RELATED APPLICATION

This application claims priority from provisional patent application Ser. No. 61/002,243 filed on Nov. 7, 2007, the complete disclosure of which is herein incorporated by reference.

BACKGROUND OF THE INVENTION

1. Field of the Invention

The invention relates to fastening devices, and more particularly to devices for facilitating alignment and installation of an item such as a door or window to a structure.

2. Brief Description of the Related Art

One of the difficulties faced in construction relates to the installation of doors and windows. There is difficulty experienced in installing shims to plumb and level jambs in connection with the installation of doors and windows. For example, an installer may fix one jamb point, only to discover that that fixed point requires adjustment when the other shims are set around the item being installed (such as for example a door or window). Shims tend to loosen during installation, and may dislocate from their positions, and even fall out of place before an installer can affix them into place (such as by nailing or the like). In addition, it is not desirable to secure shims into place until the shims are aligned in the desired position, such as, for example, to provide a level or desired alignment of the door or window. One prior attempt to provide an adjustable fastening device for doors and windows is disclosed in U.S. Pat. No. 4,655,656, issued on Apr. 7, 1987 to Jönsson for a "Fastening Device for Door or Window Frames." The '656 patent discloses an axially displaceable sleeve on a screw, where a screw head and sleeve have mating engagement means.

A need exists for an improved fastening device, which is easy and economical to produce, and which facilitates the plumbing and leveling of door and window installations.

SUMMARY OF THE INVENTION

Fastening devices which are useful for facilitating the installation of an item, such as, for example, a door or window, into a building structure, such as, for example, a frame of an entryway, or window frame.

BRIEF DESCRIPTION OF THE DRAWING FIGURES

FIG. 8a is a top plan view of a tool for facilitating installation of an item to a structure.

FIG. 8b is a front elevation view of the tool of FIG. 8a.

FIG. 8c is a perspective view of the tool of FIG. 8a.

FIG. 9 is a side elevation view showing the tool of FIG. 8a illustrating the tool in position behind a jamb.

DESCRIPTION OF THE PREFERRED EMBODIMENTS

Devices for facilitating the installation of doors and windows, and in particular for plumbing and/or leveling door/window jambs is provided. The devices may be used for facilitating the alignment of door/window jambs, and align the items being installed, and may facilitate even before shims are installed. The devices may be adjusted to fine tuning of the installation. When the desired level of adjustment is reached (for example, when the item being installed is in a desired position), the jamb may then be permanently installed to the structure.

Figure 1:
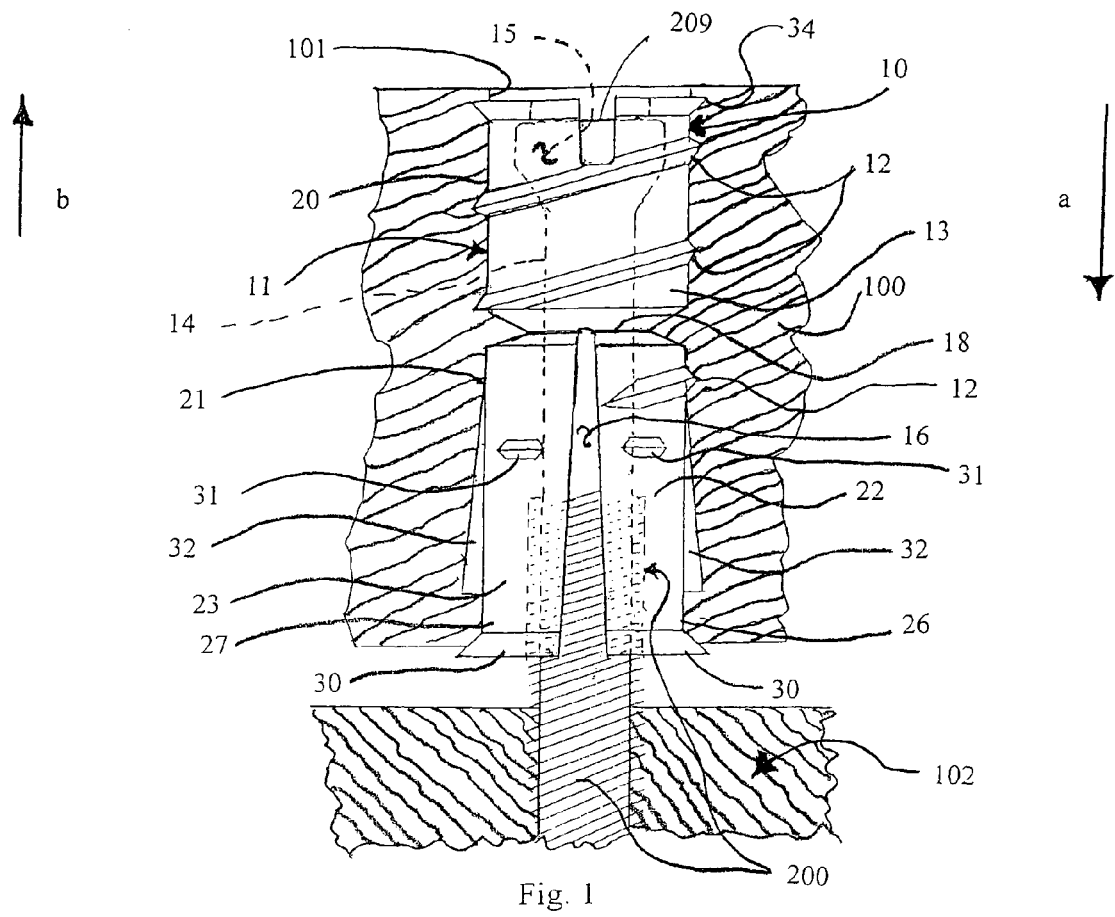
FIG. 1 is a front elevation view of a first embodiment of a fastening device shown installed in a jamb and building structure.
Figure 1A:
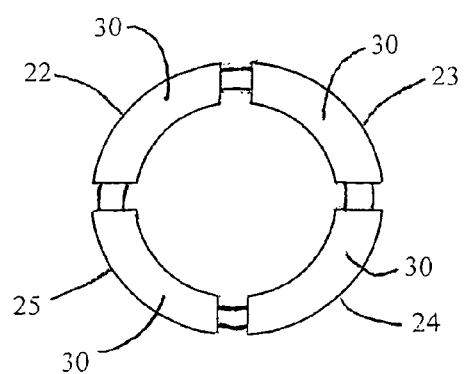
FIG. 1a is a top plan view of the fastening device of FIG. 1.
Figure 2:
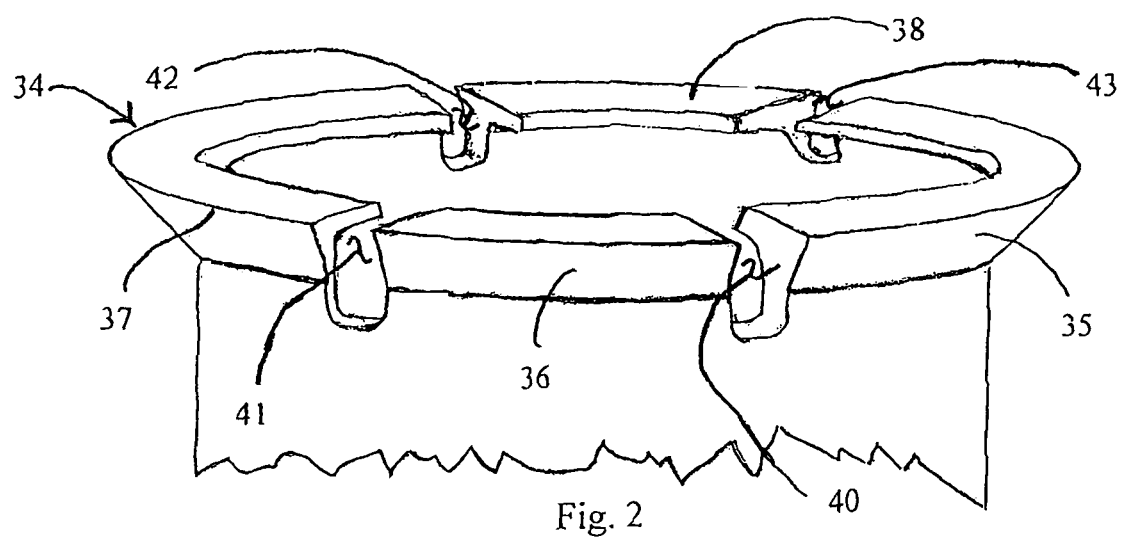
FIG. 2 is a front perspective view of the top portion of the fastening device of FIG. 1.
Figure 3:
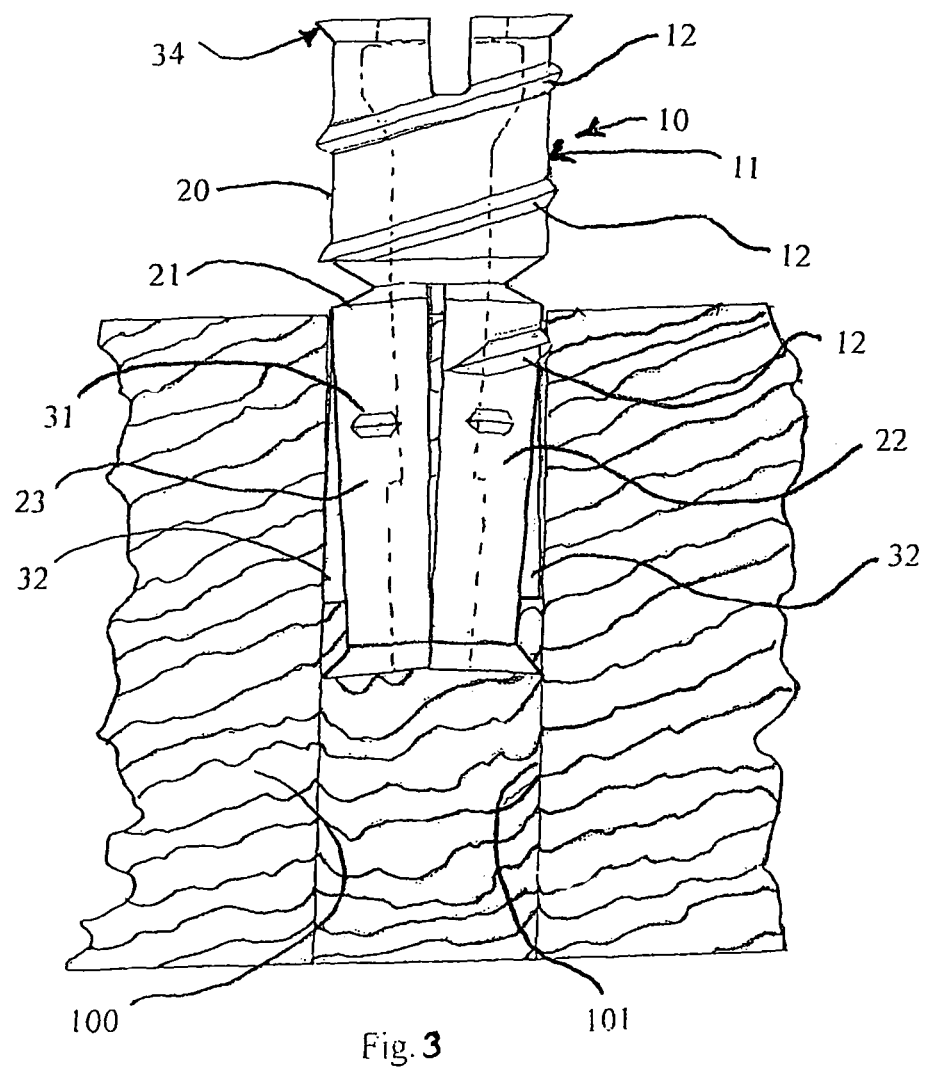
FIG. 3 is an illustration of the fastening device of FIG. 1 shown being inserted for installation in a jamb, with the jamb being shown in sectional view.

FIGS. 1-3 disclose an embodiment of the fastening device 10. The fastening device 10 is illustrated having a body 11 with threads 12 disposed on the exterior 13 of the body 11. The body 11 has an interior space 14 including a first zone 15 and a second zone 16. An optional constriction 18 divides the body space 14 into a first zone 15 and a second zone 16. As illustrated in FIGS. 1 and 3 the body 11 has an upper portion 20 and a lower portion 21. The lower portion 21 is configured for expansion. FIGS. 1, 1a and 3 show the lower body portion comprising a plurality of legs 22, 23, 24, 25. Each leg 22, 23, 24, 25 has a free end, 26, 27, (the free ends of legs 24 and 25 not being shown in the view of FIG. 1), respectively, and connects with the upper body portion 21. Retaining means is provided for retaining the device 10 from being withdrawn once the device 10 is installed. Retaining means is shown comprising a retaining portion 30 provided on each leg 22, 23, 24, 25. The retaining portion 30 engages the jamb 100 (FIGS. 1, 1a and 3). An anti-extraction nodule 31 may be provided for facilitating retention of the device 10 within a structure, such as, for example the jamb 100 shown in FIG. 1. One or more flanges 32 may also be provided along the body 11 for minimizing or eliminating undesirable rotation of the device 10 when installed. The flanges 32 are shown laterally disposed along the lower portion 21 of the body 11. The flanges 32 are illustrated in FIG. 1 disposed on the legs 22, 23, (and may be disposed on one or more of the legs 22, 23, 24, 25). The flanges 32 are configured so that the device 10 may be inserted into a bore, such as for example the bore 101 shown in FIGS. 1 and 3 when the device 10 is being installed into a bore 101. The flanges 32 also are configured to permit rotation of the device 10 during the installation of the device 10 into the jamb 100 (as in FIG. 3), but are designed to facilitate retention of the device 10 once the screw 200 is installed (see FIGS. 1 and 3).

The fastening device 10 has a rim 34 provided on the upper portion 20 of the body. The rim 34 is illustrated in the enlarged view of FIG. 2 as being configured from a plurality of segments 35, 36, 37, 38. The rim 34 is shown having a circumferential configuration. Each segment 35, 36, 37, 38 is defined on each side by a space 40, 41, 42, 43. The body 11 is constructed from a material which is strong, yet resilient, such that the segments 35, 36, 37, 38 may be living springs. Nylon or other suitable material may be used to construct the device 10.

The fastening device 10 may be used to secure items to a frame, such as, for example, a jamb of a door or window, to a frame or structure 102. A plurality of fastening devices 10 may be used, and the item, such as a door/window, may be supported with material between the jamb 100 and the structure 102. For example, shims (not shown) may be positioned between the jamb 100 and the frame structure 102, or alternately, or in addition thereto, a low-expansion insulating foam product (which is commercially available) may be used, or any other material which a building code may require or suggest.

The device 10 may be provided in different lengths and sizes. For example, while a door jamb 100 of "n" units is illustrated in FIG. 1 (e.g., ¾ of an inch) and the device 10 is also illustrated in "n" units, the device 10 may be constructed in shorter lengths and/or in longer lengths, for use, respectively, with thinner jamb's or with thicker jambs. In addition, use of a device 10 of one length may be suitable for jambs of different thicknesses. For example, the device 10 may be countersunk into a jamb to a desired depth using a counterbore. The desired depth may be a depth where retaining means, such as, for example the retaining portion 30, is engaged.

Figure 4:
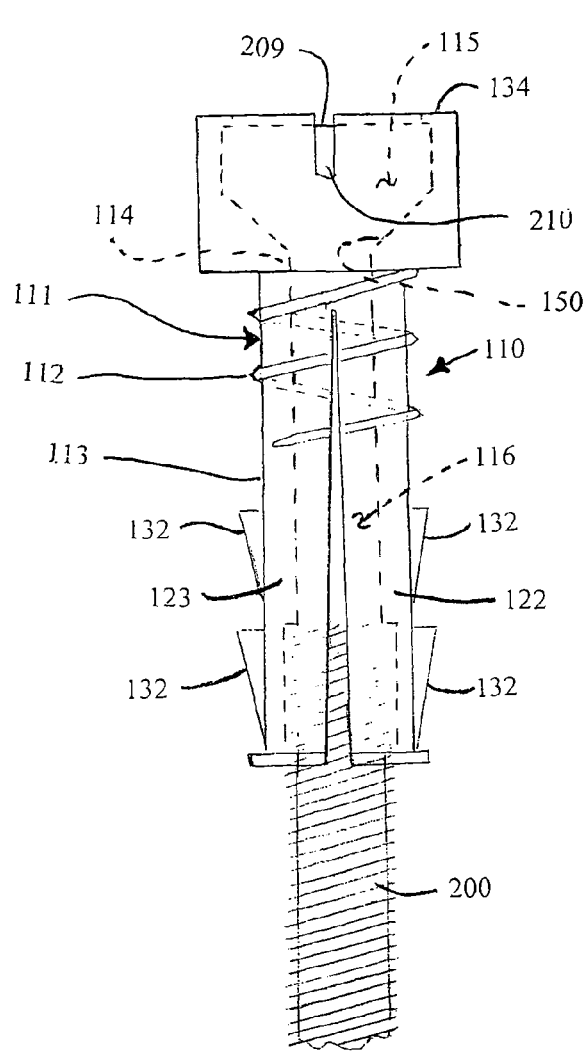
FIG. 4 is an enlarged front elevation view of an alternate fastening device.
Figure 5:
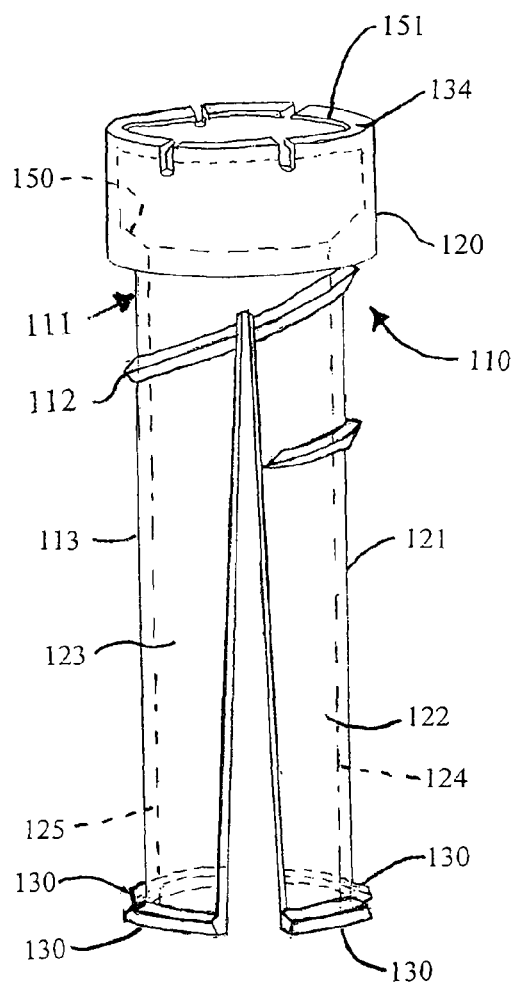
FIG. 5 is a front perspective view of the alternate fastening device of FIG. 4.
Figure 6:
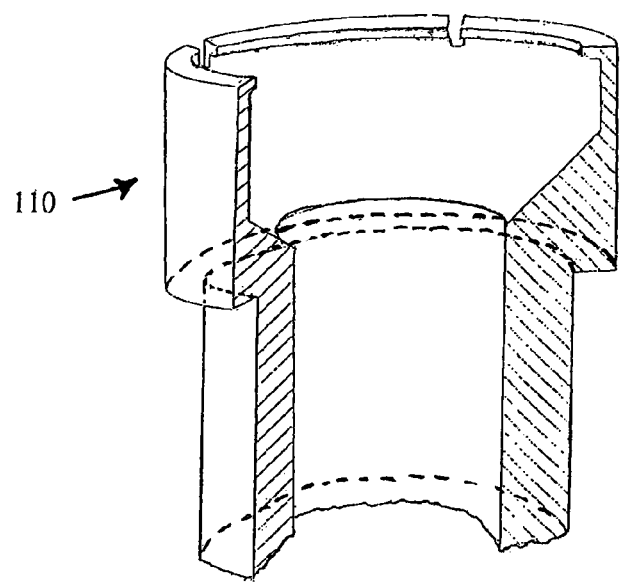
FIG. 6 is an enlarged partial sectional view of the fastening device shown in FIG. 4.

An alternate embodiment of a fastening device 110 is illustrated in FIGS. 4-6 having a body 111 with threads 112 disposed on the exterior 113 of the body 111. The body 111 has an interior space 114 including a first zone 115 and second zone 116. the body 111 has a first portion 120 and a second portion 121, the first portion 120 being cylindrically configured and the second portion 121 shown comprising a plurality of legs 122, 123, 124, 125, each leg 122, 123, 124, 125 being shown connected to the upper portion 120 and having retaining portions 130 disposed thereon. Flanges 132 (FIG. 4) are also shown for facilitating retention of the device 110 in a bore, such as, for example, the bore of a jamb. The body space 114 is configured to accommodate a fastening member therein, such as, for example the screw 200 shown in FIGS. 1 and 4. A rim 134 is provided on the upper portion 120 of the body 111, and may be configured from a plurality of segments 135, 136, 137, 138, which are separated by spaces, respectively 140, 141, 142, 143. The device 110 may be constructed from a material similar to that described herein in connection with the embodiment 10. The device 110 has an engaging surface 150 for engaging the head 209 of a screw 200. The rim 134 also provides a flanged edge 151 for engagement with the screw head 209. When the screw 200, for example, is installed in a device 110 which is installed in a jamb, (such as the jamb 100) rotating the screw 200 in a first direction, such as a clockwise direction, will move the device 110 and the jamb 100 in which it is installed together in a first direction (along arrow "a" of FIG. 1), and conversely, rotating the screw 200 in a second direction, such as a counterclockwise direction, will cause the screw to engage the flange 151 of the rim 134 to move the device 110 and the jamb 100 in which it is installed in a second direction (along arrow "b" of FIG. 1). Thus the device 10 facilitates precise alignment of the jamb 100 and window/door attached thereto.

The devices 10 and 110 may be used by predrilling a bore, such as the bore 101 illustrated in the drawings, and inserting the device into the bore 101. The device 10, 110 may be installed in the bore 101 by rotating with a tool, such as, a screwdriver which may use the spaces provided in the rim of the device 10, 110. The jamb 100 is held in place and a screw, such as, the screw 200, is installed so that the screw 200 penetrates the rim 34, 134 of the device 10, 110 causing the screw head 209 to expand the rim 34, 134 and pass the rim so that the screw head 209 is contained within the first zone 15, 115 of the body space 14, 114. Once the screw 200 is in that position, as illustrated in the FIGS. 1, 3 and 4, with the screw 200 within the device 10, 110 the screw 200 may rotate freely relative to the device 10, 110 so that rotation of the screw in one direction reverses (moves the jamb) and device 10, 110 as a unit in a first direction and rotation of the screw in a second direction moves the jamb and device 10, 110 in the opposite direction. Through this procedure, alignment of the jamb and window/door to which it is attached may be accomplished precisely aligned.

Figure 7:
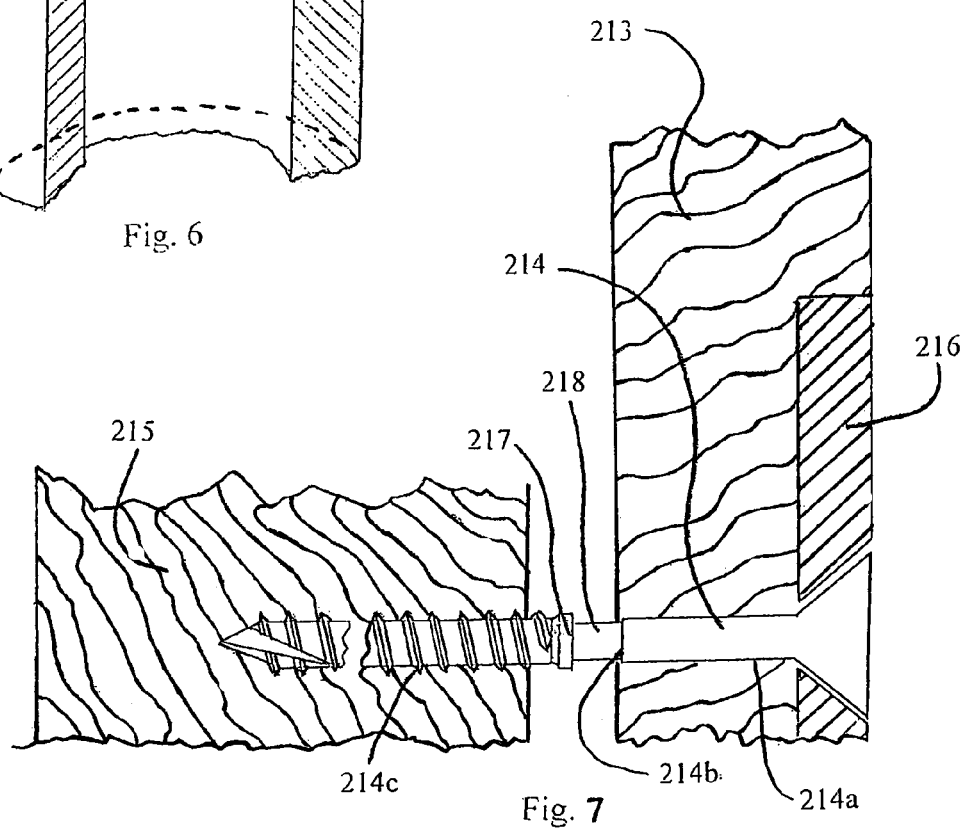
FIG. 7 is a front elevation view of an alternate embodiment of a fastening device shown installed in a jamb and building structure, with the jamb and building structure being shown in sectional view.

A second alternate embodiment is illustrated in FIGS. 8a, 8b and 8c. A preferred configuration of a device or tool 211 with flanges or turns 210 is illustrated. The flanges or turns 210 at the end stop the tool 211 from spinning past the plane of the finish wall, i.e., behind the jamb 212. Turns 210 go both ways to always hit the jamb 212, regardless of which way it's hinged (left or right). According to alternate embodiments, the slot 213 may be stepped to incrementally increasing thicknesses; for example: 3/32, 1/8, 5/32, 3/16. This accommodates variations in jamb thickness and depth of hinge mortise. Or a gradual tapered slot may better keep the SHIM-EASE™ screw firmly seated in the hinge 216 (the term SHIM-EASE™ as used herein refers to the screws for facilitating installation of an item in a building structure, as shown and described in the application, drawing figures and the appended claims). The screw 214 is shown in FIG. 7 having a non-threaded shaft portion 214a. Optionally, the screw shaft may include a recessed shaft portion 214b. A collar 217 is also shown provided on the screw shaft in proximity to the threads. The collar 217 facilitates abutment or engagement with the tool 211 so that the screw 214, when turned, rotates within the jamb and preferably does not back out. The collar 217, according to preferred embodiments, may be provided as part of the screw 214. The screw 214 is shown with a threaded portion 214c, which may include one or more types of threads.

According to a preferred embodiment the tool 211, according to one example, may be used as follows. Remove the hinge screw closest to door stop. Hold the jamb 212 in place and screw a self-tapping SHIM-EASE™ screw 214 through the jamb 212 into the jack stud 215 until the screw 214 is seated in the hinge 216. Slide tool 211 onto the SHIM-EASE™ screw shaft portion 218 between its collar 217 and the jamb 212 to secure it in place. The SHIM-EASE™ screw 214 now spins freely, serving its purpose: Screw clockwise to draw the jamb 212 closer to the stud 215; counter-clockwise to increase the space between the jamb 212 and stud 215. Fine-tuning may be accomplished with ease using the tool 211 and screw 214. Once jamb 212 is plumb, shim, nail and remove tool 211.

One example of use of the tool 211 may be with a door installation. According to one embodiment, an installer may plumb the door, then align the jambs to the door. A level, such as a 12" level, may be used to facilitate alignment. Once the top screw is installed, the door is secure and not cumbersome. Once the bottom screw is installed, the weight of the door is supported by the stud via the hinge. The secured door is balanced and resists twisting the jamb with uneven loading. The door may then be plumbed by adjusting the two screws. Once the door is plumb, the jamb is shimmed to keep an even gap with the door.

Figure 10:
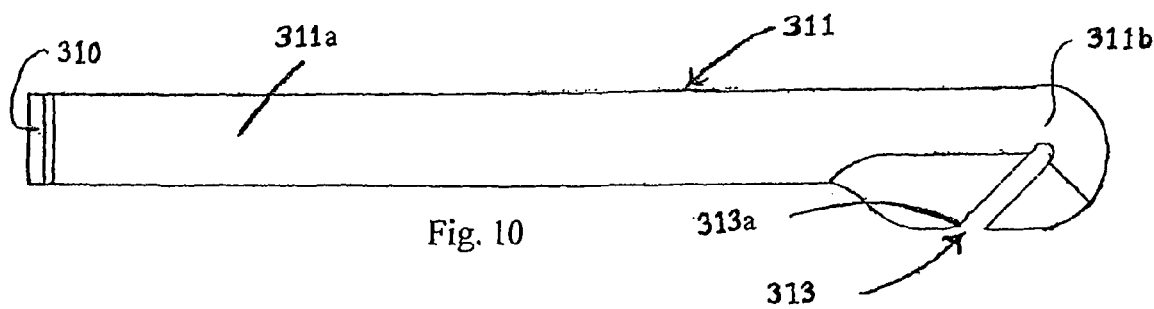
FIG. 10 is a front elevation view of an alternate embodiment of a tool for facilitating installation of an item to a structure.
Figure 11:
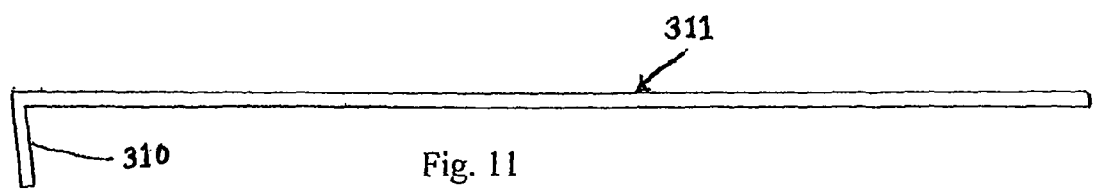
FIG. 11 is a top plan view of the tool of FIG. 10.
Figure 12:
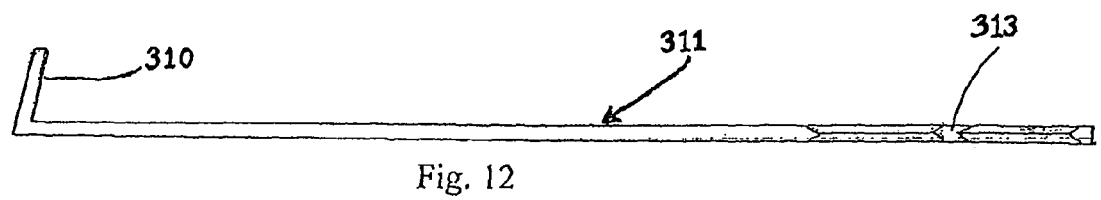
FIG. 12 is a bottom plan view of the tool of FIG. 10.

Referring to FIGS. 10, 11 and 12, an alternate embodiment of a tool 311 is illustrated having a slot 313 and a bend or turn 310. The tool 311 preferably is used similarly to the tool 211 described and shown herein. The turn 310 preferably, like the turns 210 of the tool 211 prevent the tool 311 from turning when used ash shown and described herein. The tool 311 is illustrated having a slot 313. The slot width preferably is provided to accommodate and function with the diameter of the screw shaft being used. For example, according to one preferred embodiment, the slot width may be 3.7 mm. The slot 313 may include an arced or radiused edge portion 313a to facilitate engagement of the tool 311 with a fastener, such as the screws 214 or 314 shown and described herein. Preferably, the bend or turn 310 is inturned. According to a preferred embodiment, the inturn is approximately 95 degrees from the body portion 311a of the tool 311. According to a preferred embodiment, the slot may be angled, and preferably, may be provided at about a 45 degree angle. The body portion, according to preferred embodiments, may be narrower relative to the head portion 311b where the slot 313 is provided.

Figure 13:
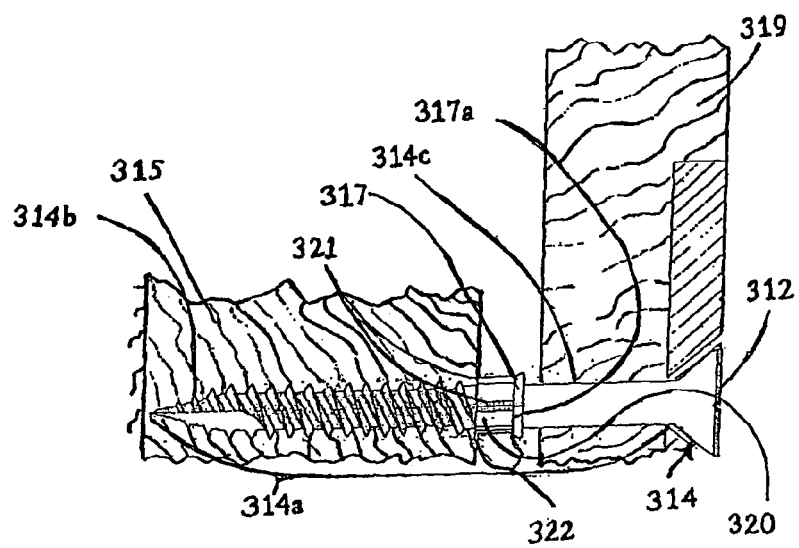
FIG. 13 is a side elevation view of an alternate embodiment of a fastening device shown installed in a jamb and building structure, with the jamb and building structure being shown in sectional view.

An alternate embodiment of a screw 314 is illustrated in FIG. 13. The screw 314 may be used with a tool, such as the tool 211 or the alternate tool 311. The screw 314 is shown in an exemplary environment where the screw 314 is being used to install an item, such as the door jamb 319 in a structure, such as, for example, the building structure or stud 315. The screw 314, like the screw 214, is designed to facilitate installation of an item in a building structure. The fastener or screw 314 includes a shaft 314a having at least one threaded portion 314b, at least one non-threaded portion 314c, and a collar 317. The collar 317 separates the threaded portion 314b from the non-threaded portion 314c. The screw 314 also has a head 312 which is illustrated connected to the non-threaded portion 314c. A boring portion 320 is provided on the shaft 314a. The boring portion includes one or more elements, such as the splines 321 (which may be uniform or nonuniformly provided about the shaft circumference). The splines 321 are shown disposed between the collar 317 and the threaded portion 314b. According to a preferred embodiment, the fastener head 312 has an impression therein for receiving a driving device (such as for example a Philips head screwdriver, or other driving tool). The splines 321 preferably form a spline portion 322 on the shaft 314a, and, according to a preferred embodiment, the diameter of the spline portion 322 is equal to or less than the diameter of the collar 317. The collar 317 may include an angled or beveled edge portion 317a. The beveled portion 317a is illustrated provided on the leading portion of the collar 317.

The boring mechanism of the screw 314 is provided for boring through an item, such as a door jamb 319 illustrated in FIG. 13, and into the structure to which the item is to be attached, such as the building or stud 315. Accordingly, a boring surface, such as the splines 321 are configured to bore through the structure when the screw 314 is rotated.

Figure 14:
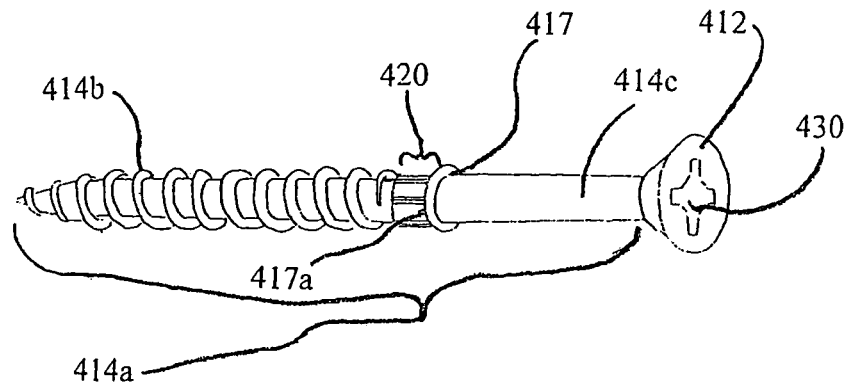
FIG. 14 is a side perspective view of an alternate embodiment of a fastening device.
Figure 15:
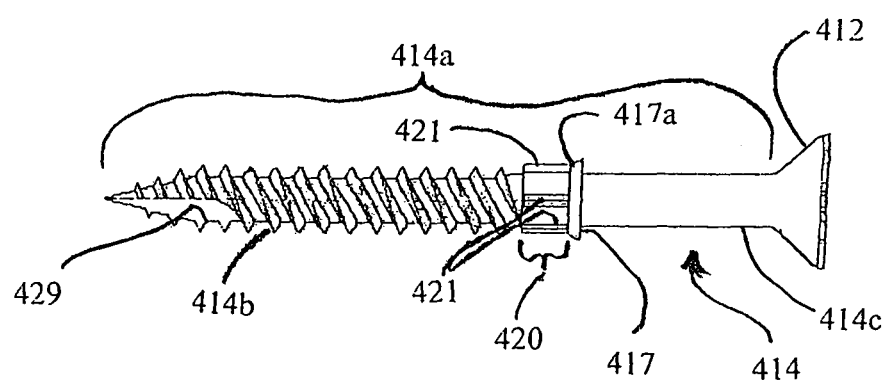
FIG. 15 is a side elevation view of the fastening device of FIG. 14.

FIGS. 14 and 15 illustrate another alternate embodiment of a fastening device according to the invention illustrated as the screw 414. The screw 414 may function like the screw 314 shown and described herein. The fastener or screw 414 includes a shaft 414a having at least one threaded portion 414b, at least one non-threaded portion 414c, and a collar 417. The collar 417 separates the threaded portion 414b from the non-threaded portion 414c. The screw 414 also has a head 412 which is illustrated connected to the non-threaded portion 414c. A boring portion 420 is provided on the shaft 414a. The boring portion 420 preferably includes one or more elements, such as the splines 421 which are shown on the shaft 414a. The splines 421 are shown disposed between the collar 417 and the threaded portion 414b. The fastener head 412 has an impression 430 disposed therein for receiving a driving device (such as for example a Philips head screwdriver, or other driving tool). The splines 421 preferably are provided on the boring portion 420. The collar 417 is illustrated with an angled or beveled edge portion 417a. The beveled portion 417a is illustrated provided on the leading portion of the collar 417. An optional tapping surface 429 is shown provided on the leading end of the screw 414 to facilitate engagement and installation into a structure or item.

While the invention is broadly described, other modifications and variations within the spirit and scope of this invention may be made.

What is claimed is:

1. A device for facilitating installation of an item to a building structure comprising a fastener including a shaft having at least one threaded portion, at least one non-threaded portion, a head for driving said device, said non-threaded portion being disposed between a collar and said head, and tool engaging means for engaging a tool, said tool engaging means comprising said collar configured for engaging a tool for fixing said tool against the item to be installed in said structure, the collar being configured to hold said tool against said item, said non-threaded shaft portion having a surface that permits adjustment of said device when said device is driven in a first direction to move the item closer to the building structure to which the item is being installed, and that permits adjustment of said device when said device is driven in a second direction to move the item further apart from the building structure to which the item is being installed;

wherein said tool engaging means comprising said collar is configured to pass through said item for providing tool engaging access to said collar when said threaded portion engages said building and when said threaded portion is driven in a said first direction or in a said second direction;

the device including a boring portion disposed on said shaft and extending below said collar;

wherein said boring portion comprises splines; and wherein said splines are disposed between said collar and said threaded portion.

2. The device of claim 1, wherein the collar separates said threaded portion from said non-threaded portion, said collar having a leading portion that faces the direction of said threaded shaft portion, and wherein said collar has a beveled portion provided on said collar leading portion, and wherein said beveled portion includes an edge that converges to touch said shaft.

3. The device of claim 1, wherein said head is connected to said non-threaded portion.

4. The device of claim 1, wherein the fastener head has an impression therein for receiving a driving device.

5. The device of claim 4, wherein the splines form a spline portion and wherein the diameter of the spline portion is equal to or less than the diameter of said collar.

6. A method for installing a hinged item in a building structure, comprising: installing the fastener of claim 1 through the item and into the building structure until the fastener is seated in a hinge; engaging with an engaging element having a body with a slot therein and having at least one flange provided at an end thereof which is configured to regulate the relative movement of said fastener for facilitating installation of the item within the structure the fastener shaft non-threaded portion between the collar and the item to secure the item in place; rotating the fastener to draw the item closer to the building structure; aligning the item by rotating the fastener clockwise or counterclockwise to position the item in a desired position relative to the building structure.

7. The device of claim 1, further comprising an engaging element having a body with a slot therein and having at least one flange provided at an end thereof which is configured to regulate the relative movement of said fastener for facilitating installation of the item within the structure.

8. The device of claim 7, wherein said slot includes a radiused edge portion.

9. The device of claim 7, wherein said slot is angularly provided.

10. The device of claim 7, wherein said body is elongated and includes a head portion and wherein said slot is provided in said head portion.

11. The method of claim 6, including removing said engaging element from the structure after the item has been aligned.

12. The method of claim 6, wherein installing the fastener includes boring with said boring portion provided on said fastener providing a bore in said item.

13. The method of claim 12, wherein boring provides a bore having a bore diameter that approximates the diameter of said collar.

14. The device of claim 1, wherein said collar has an axial length, and wherein said threaded portion is disposed on the axial side of said collar opposite the axial side of said collar where said non-threaded portion is disposed.

15. The device of claim 1, wherein said collar extends along the length of said shaft and is contiguous with said shaft along said shaft length that the collar extends, wherein said collar is smaller in diameter than the diameter of said head; and wherein said at least one non-threaded shaft portion and said at least one threaded shaft portion have diameters that are substantially the same.

* * * * *